(12) United States Patent
Ohara et al.

(10) Patent No.: US 11,112,279 B2
(45) Date of Patent: Sep. 7, 2021

(54) OPTICAL MODULE AND OPTICAL ENCODER COMPRISING A DUMMY LIGHT RECEIVING DEVICE FORMED BETWEEN A LIGHT RECEIVING DEVICE AND A THROUGH HOLE IN A SENSOR SUBSTRATE

(71) Applicants: Tomomitsu Ohara, Tokyo (JP); Kazuki Tsutsumi, Tokyo (JP); Shinji Kimura, Tokyo (JP); Syuhei Suzuki, Tokyo (JP); Yusuke Ohba, Tokyo (JP)

(72) Inventors: Tomomitsu Ohara, Tokyo (JP); Kazuki Tsutsumi, Tokyo (JP); Shinji Kimura, Tokyo (JP); Syuhei Suzuki, Tokyo (JP); Yusuke Ohba, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 85 days.

(21) Appl. No.: 16/807,585

(22) Filed: Mar. 3, 2020

(65) Prior Publication Data
US 2020/0284620 A1 Sep. 10, 2020

(30) Foreign Application Priority Data
Mar. 7, 2019 (JP) .............................. JP2019-041594

(51) Int. Cl.
*G01D 5/347* (2006.01)
*G01D 5/30* (2006.01)

(52) U.S. Cl.
CPC ........... *G01D 5/34746* (2013.01); *G01D 5/30* (2013.01); *G01D 5/34715* (2013.01)

(58) Field of Classification Search
CPC . H01L 31/022425; H01L 31/103; G01D 5/30; G01D 5/34715; G01D 5/34746
USPC .................................. 250/231.13, 551, 239
See application file for complete search history.

(56) References Cited

U.S. PATENT DOCUMENTS 7,220,960 B2    5/2007  Ito
9,093,590 B2 *  7/2015  Sakamoto ........... H01L 31/0224

FOREIGN PATENT DOCUMENTS

JP          4021382          12/2007

* cited by examiner

*Primary Examiner* — Que Tan Le
(74) *Attorney, Agent, or Firm* — IPUSA, PLLC (57) ABSTRACT

An optical module includes a fixed substrate, and a sensor substrate secured to the fixed substrate and having a through-hole formed therein. A light emitting device is secured to the fixed substrate at a position in the through-hole. A light receiving device is provided in the sensor substrate. A dummy light receiving device is formed between the light receiving device and the through-hole, around the through-hole, and in the sensor substrate. The light receiving device and the dummy light receiving device are made of an impurity diffusion layer having a same conductive type as a conductive type of a surface layer of the sensor substrate. The dummy light receiving device is deeper than the light receiving device.

8 Claims, 7 Drawing Sheets

OPTICAL MODULE AND OPTICAL ENCODER COMPRISING A DUMMY LIGHT RECEIVING DEVICE FORMED BETWEEN A LIGHT RECEIVING DEVICE AND A THROUGH HOLE IN A SENSOR SUBSTRATE

CROSS-REFERENCE TO RELATED APPLICATION

The present application is based on and claims priority to Japanese Priority Application No. 2019-041594 filed on Mar. 7, 2019, the entire contents of which are hereby incorporated herein by reference.

BACKGROUND OF THE INVENTION

1. Field of the Invention

The present disclosure relates to an optical module and an optical encoder.

2. Description of the Related Art

Optical encoders have been used to detect an amount of rotation, a rotational speed and a direction of rotation of a servo motor. The optical encoders include a transmission type encoder for detecting light having transmitted through a scale and a reflection type encoder for detecting light reflected at the scale. In particular, reflective type optical encoders are widely used in recent years because they can be made smaller and thinner.

For example, Japanese Patent No. 4021382 discloses a reflective type optical encoder having a configuration in which a through-hole is provided at the center of a sensor substrate having a light receiving device, and in which a light source such as an LED (Light-Emitting Diode) is disposed in the through-hole or a concave portion.

As described above, when the light source is disposed in the through-hole of the sensor substrate, light emitted from the upper surface of the light source is reflected at the scale, and the light receiving element of the sensor substrate receives the reflected light.

Light sources such as LEDs emit light not only from the top surface but also from the side surface. Therefore, when a light source is disposed in a through-hole of the sensor substrate, light (side light) that leaks from the side surface of the light source directly enters the sensor substrate. Because the sensor substrate is formed of a semiconductor substrate, the sensor substrate receives the side light incident from the lateral surface. Reception of this side light generates a noise current in the sensor substrate. Japanese Patent No. 4021382 discloses that a light blocking member is provided on the side wall of the through-hole of the sensor substrate by a thin metal film, such as aluminum.

However, in order to provide a light blocking member with a thin metal film as described in Japanese Patent No. 4021382, it is necessary to add a manufacturing process for forming the light blocking member, which increases the manufacturing cost.

Also, to dispose the light source in the through-hole, the light source and the sensor substrate need to be secured to a fixed substrate. Side light emitted from the lateral surface of the light source is reflected at the interface between the fixed substrate and the sensor substrate, and may enter the sensor substrate from the backside of the sensor substrate.

SUMMARY OF THE INVENTION

The present disclosure provides an optical module and an optical encoder that are easy to manufacture and allow for more reliable blocking of side light from the light source.

According to an embodiment, there is provided an optical module that includes a fixed substrate, and a sensor substrate secured to the fixed substrate and having a through-hole formed therein. A light emitting device is secured to the fixed substrate at a position in the through-hole. A light receiving device is provided in the sensor substrate. A dummy light receiving device is formed between the light receiving device and the through-hole, around the through-hole, and in the sensor substrate. The light receiving device and the dummy light receiving device are made of an impurity diffusion layer having a same conductive type as a conductive type of a surface layer of the sensor substrate. The dummy light receiving device is deeper than the light receiving device.

Additional objects and advantages of the embodiments are set forth in part in the description which follows, and in part will become obvious from the description, or may be learned by practice of the disclosure. The objects and advantages of the disclosure will be realized and attained by means of the elements and combinations particularly pointed out in the appended claims. It is to be understood that both the foregoing general description and the following detailed description are exemplary and explanatory and are not restrictive of the disclosure as claimed.

DETAILED DESCRIPTION OF THE PREFERRED EMBODIMENTS

Embodiments of the present disclosure are described below with reference to accompanying drawings. In each drawing, the same components are indicated by the same reference numerals, and overlapping descriptions may be omitted.

First Embodiment

Hereinafter, a reflective type optical encoder according to a first embodiment of the present disclosure will be described below.

Figure 1:
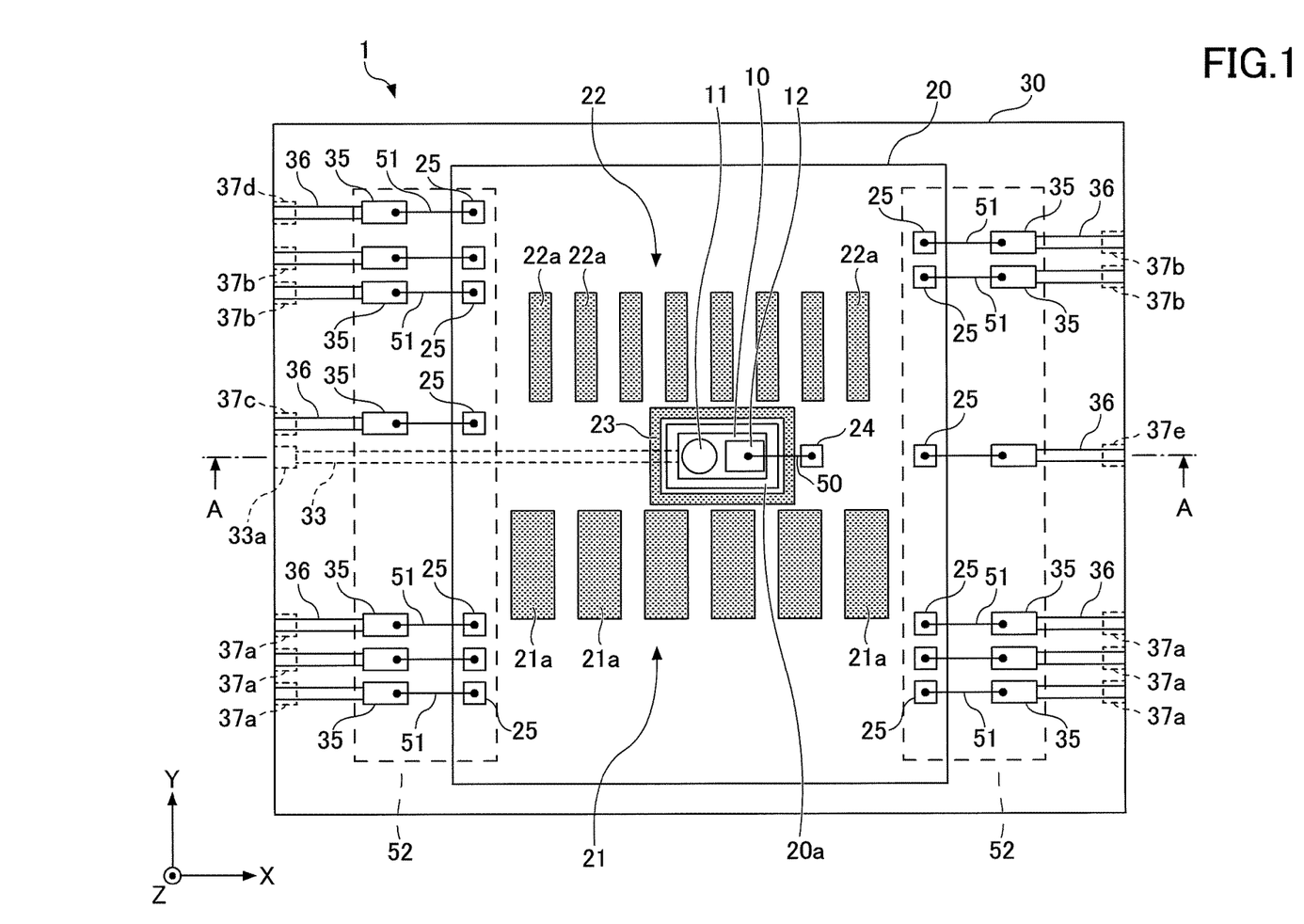
FIG. 1 is a plan view illustrating a schematic configuration of an optical encoder according to a first embodiment.
Figure 2:
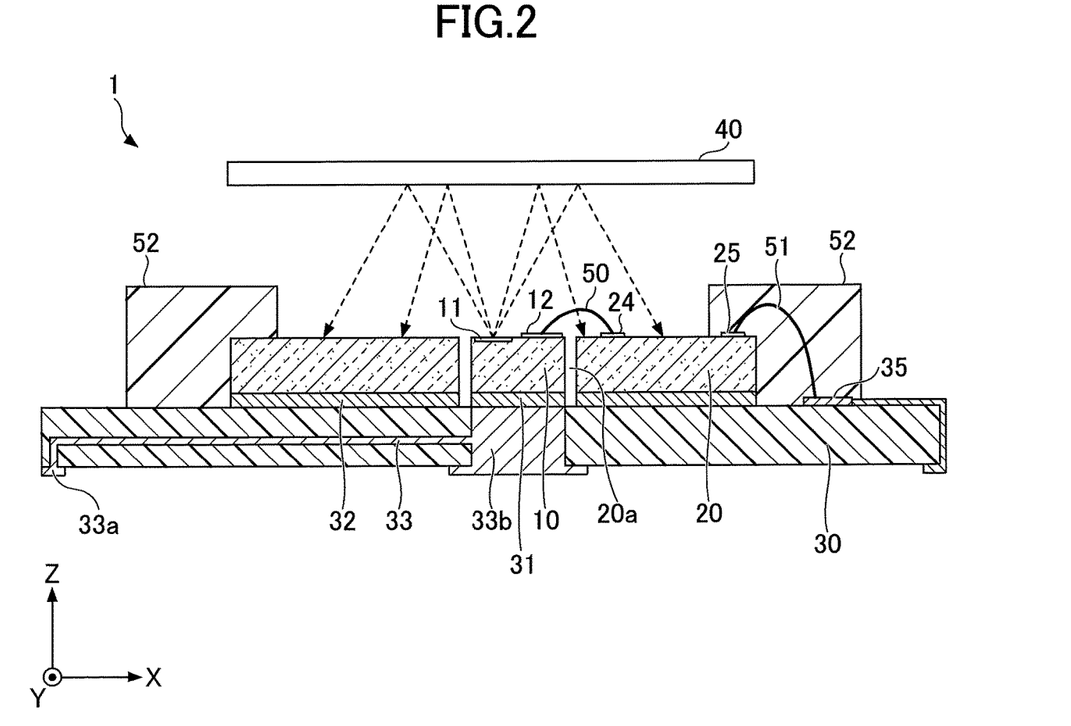
FIG. 2 is a longitudinal cross-sectional view along a line A-A in FIG. 1.

FIG. 1 is a plan view illustrating a schematic configuration of an optical encoder 1 according to a first embodiment. FIG. 2 is a longitudinal cross-sectional view of an optical encoder 1 cut along an A-A line in FIG. 1. It should be noted that one direction in the plane illustrated in FIG. 1 is an X direction, and the direction perpendicular to the X direction is a Y direction. In addition, the direction perpendicular to the X direction and the Y direction shall be the Z direction.

The light emitting device 10 is, for example, an LED. The light emitting device 10 is a pn junction type diode and emits light from the light emitting window 11 disposed on the top surface that is on the anode side (p-type side). A terminal 12 for applying a power supply voltage is formed on the upper surface of the light emitting device 10 on the anode side.

The sensor substrate 20 is a semiconductor substrate having a rectangular shape in a plan view, and has a through-hole 20a having a rectangular shape in a plan view and formed at a substantially central portion. The light emitting device 10 is disposed within a through-hole 20a. The through-hole 20a can be formed, for example, by dry etching. The shape of the through-hole 20a in a plan view is not limited to a rectangular shape, but may be a shape such as a circular shape.

As illustrated in FIG. 2, the top surface of the light emitting device 10 is substantially identical to the top surface of the sensor substrate 20. The light emitting device 10 and the sensor substrate 20 are secured to the fixed substrate 30 via adhesive layers 31 and 32, respectively. The fixed substrate 30 is a rectangular-shaped insulating substrate larger than the sensor substrate 20.

The adhesive layers 31 and 32 are made of a conductive adhesive such as a silver paste. The light emitting device 10 has a lower surface that is a cathode side (n-type side) secured to the fixed substrate 30 through the adhesive layer 31. In this embodiment, the adhesive layer 32 that joins the sensor substrate 20 to the fixed substrate 30 may be an insulator.

The fixed substrate 30 is formed with an internal interconnection 33, which is made of copper (Cu) or the like, for providing the ground potential to the cathode of the light emitting device 10. The internal interconnection 33 is partially exposed from the upper surface of the fixed substrate 30, and the exposed portion is electrically connected to the lower surface (cathode) of the light emitting device 10 via the adhesive layer 31. The internal interconnection 33 is connected to external terminals 33a and 33b provided on the lower surface of the fixed substrate 30.

A terminal 12 on the upper surface of the light emitting device 10 is connected to an electrode pad 24 provided on the upper surface of the sensor substrate 20 via a bonding wire 50.

The scale 40 is a reflection plate having a predetermined pattern formed on a transparent substrate, such as glass, by a thin metal film or the like. Light emitted from the light emitting device 10 is partially reflected by the scale 40 and enters the sensor substrate 20. The sensor substrate 20 detects light modulated by the scale 40.

As illustrated in FIG. 1, the sensor substrate 20 includes a first light receiving device group 21 and a second light receiving device group 22. The first light receiving device group 21 is a light receiving device group for absolute detection that is composed of a plurality of light receiving devices 21a arranged in the X direction at a predetermined pitch. The second light receiving device group 22 is a light receiving device group for incremental detection that is composed of a plurality of light receiving devices 22a arranged in the X direction at a pitch different from that of the first light receiving device group 21. As will be described later in detail, each of the light receiving device 21a and the light receiving device 22a is a pn junction type photodiode.

A dummy light receiving device 23 is formed around the through-hole 20a in the sensor substrate 20 so as to surround the through-hole 20a. That is, the dummy light receiving element 23 is disposed between the light emitting device 10 and the first and second light receiving device groups 21 and 22. The dummy light receiving device 23 is a photodiode of the pn junction type and receives side light mainly leaking from the lateral surface of the light emitting device 10.

A plurality of electrode pads 25 are formed on the upper surface of the sensor substrate 20 along a side parallel to the Y direction. Each electrode pad 25 is connected to the first light receiving device group 21, the second light receiving device group 22, the dummy light receiving device 23 and the like through an interconnection layer (not illustrated) formed on the surface of the sensor substrate 20.

Electrode pads 35 are formed on the upper surface of the fixed substrate 30 opposite respective electrode pads 25 of the sensor substrate 20. The electrode pads 25 and the electrode pads 35 facing the electrode pads 25 are connected via bonding wires 51. The electrode pads 25 and 35 are formed of aluminum or the like. The electrode pads 25, the electrode pads 35, and the bonding wires 51 are sealed by resin 52.

Each electrode pad 35 is connected to an external terminal 37 formed on the lower surface of the fixed substrate 30 through an interconnection 36 made of copper or the like. The external terminal 37 is classified into a first external terminal 37a, a second external terminal 37b, a third external terminal 37c, a fourth external terminal 37d, and a fifth external terminal 37e.

The first external terminal 37a is a detection terminal for acquiring a detection signal for absolute detection from the first light receiving device group 21. The second external terminal 37b is a detection terminal for acquiring a detection signal for incremental detection from the second light receiving element group 22. The third external terminal 37c is a ground terminal for providing the ground potential (GND) for the dummy light receiving element 23 on the anode side (p-type side).

The fourth external terminal 37d is a power supply terminal for supplying a power supply voltage (VCC) to each light receiving device 21a included in the first light receiving device group 21, to each light receiving device 22a included in the second light receiving device group 22, and to the dummy light receiving device 23 on the cathode side (n-type side) so that the photodiode forming each light receiving device is reverse biased. The fifth external terminal 37e is a power source terminal for supplying a power supply voltage (VCC) to the anode side of the light emitting device 10.

Figure 3:
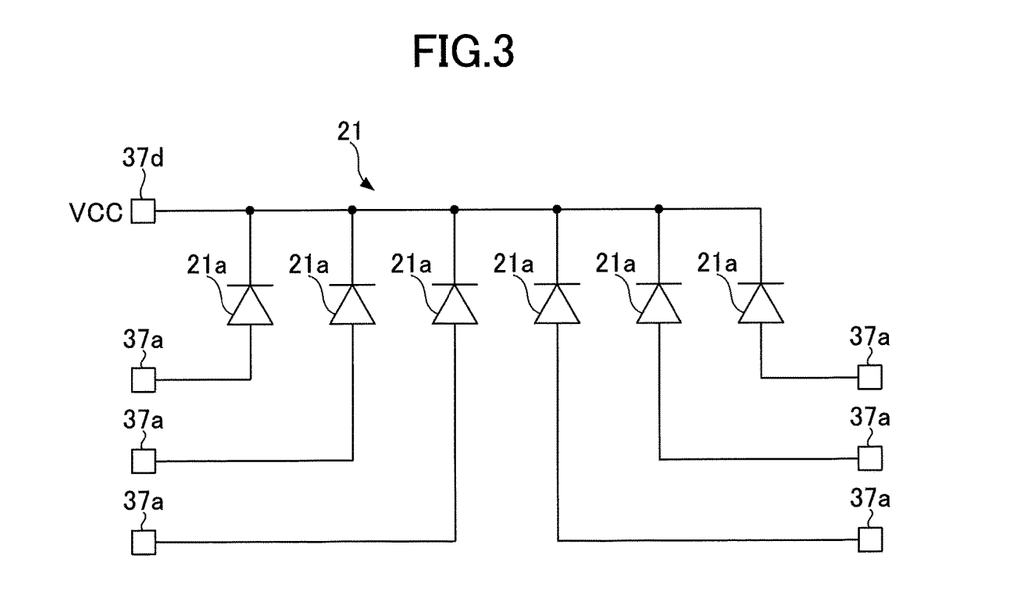
FIG. 3 is a diagram illustrating an electrical connection between a first light receiving device group and an external terminal.

FIG. 3 is a diagram illustrating an electrical connection of each light receiving device 21a included in the first light receiving device group 21 to the first external terminal 37a and the fourth external terminal 37d. As illustrated in FIG. 3, each first external terminal 37a is connected to any one of the light receiving devices 21a included in the first light receiving device group 21. The absolute position information can be detected by the detection signal obtained by the first external terminal 37a.

Figure 4:
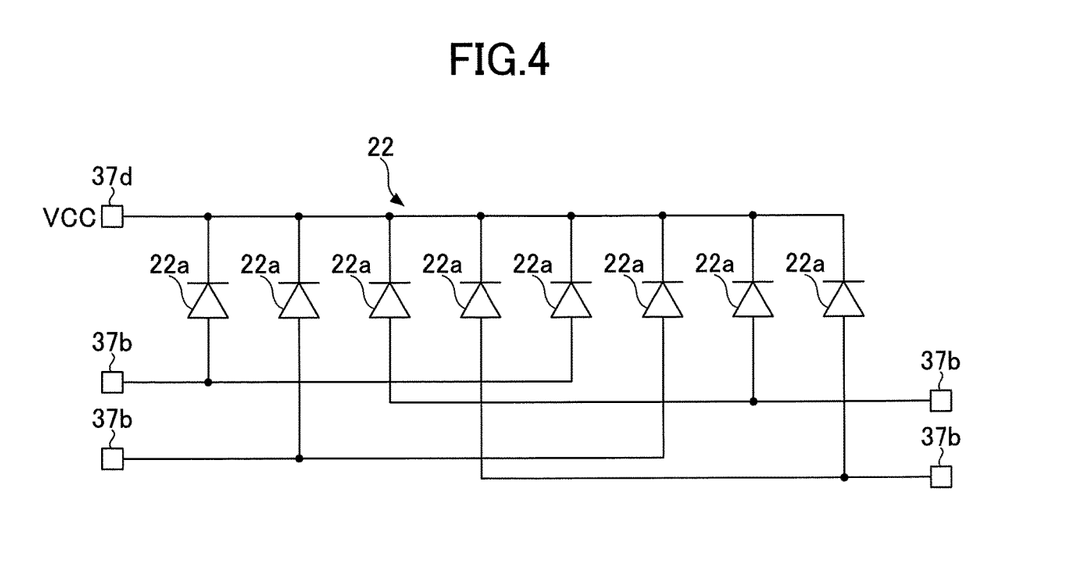
FIG. 4 is a diagram illustrating an electrical connection between a second light receiving device group and an external terminal.

FIG. 4 is a diagram illustrating an electrical connection of each light receiving device 22a included in the second light receiving device group 22 to the second external terminal 37b and the fourth external terminal 37d. As illustrated in FIG. 4, each of the second external terminals 37b is connected to two of the light receiving devices 22a included in the second light receiving device group 22. Specifically, each second external terminal 37b is connected to two light receiving devices 22a that are four times as distant as the array pitch of the light receiving element 22a. The relative position information can be detected by the detection signal obtained by the second external terminal 37b.

Figure 5:
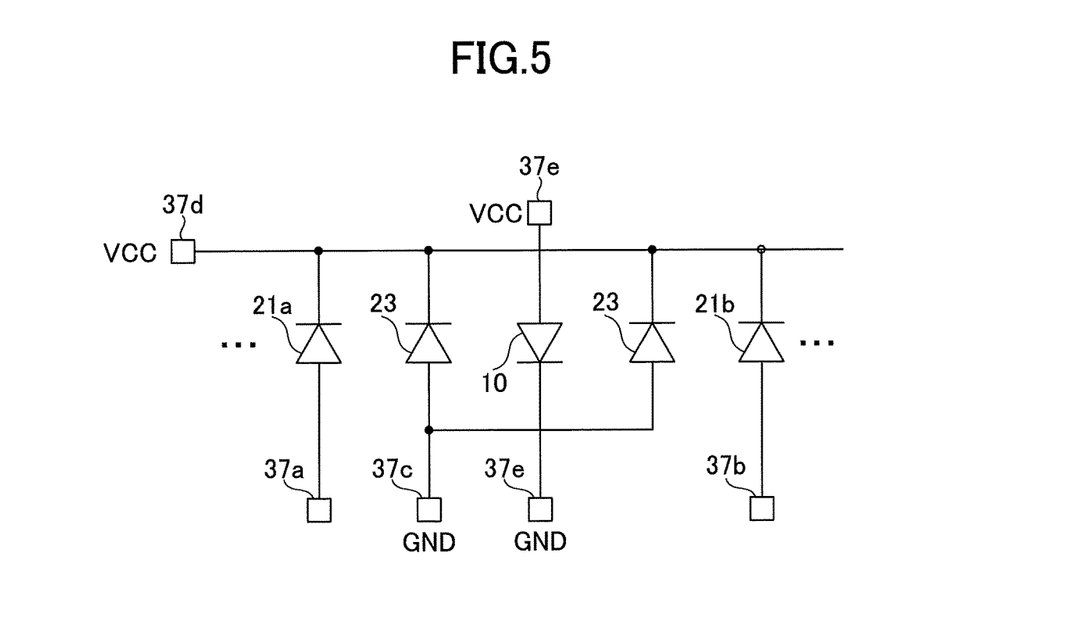
FIG. 5 is a diagram illustrating an equivalent circuit of an entire optical module.

FIG. 5 is a diagram illustrating an equivalent circuit of the entire optical module. As illustrated in FIG. 5, the light emitting device 10 emits light by being forward biased. The light emitted from the light emitting device 10 is received by the light receiving device 21a and the light receiving device 22a that are reverse biased. The side light of the entire light emitted from the light emitting device 10 is received and absorbed by the dummy light receiving device 23 that is regarded as a reverse bias.

Figure 6:
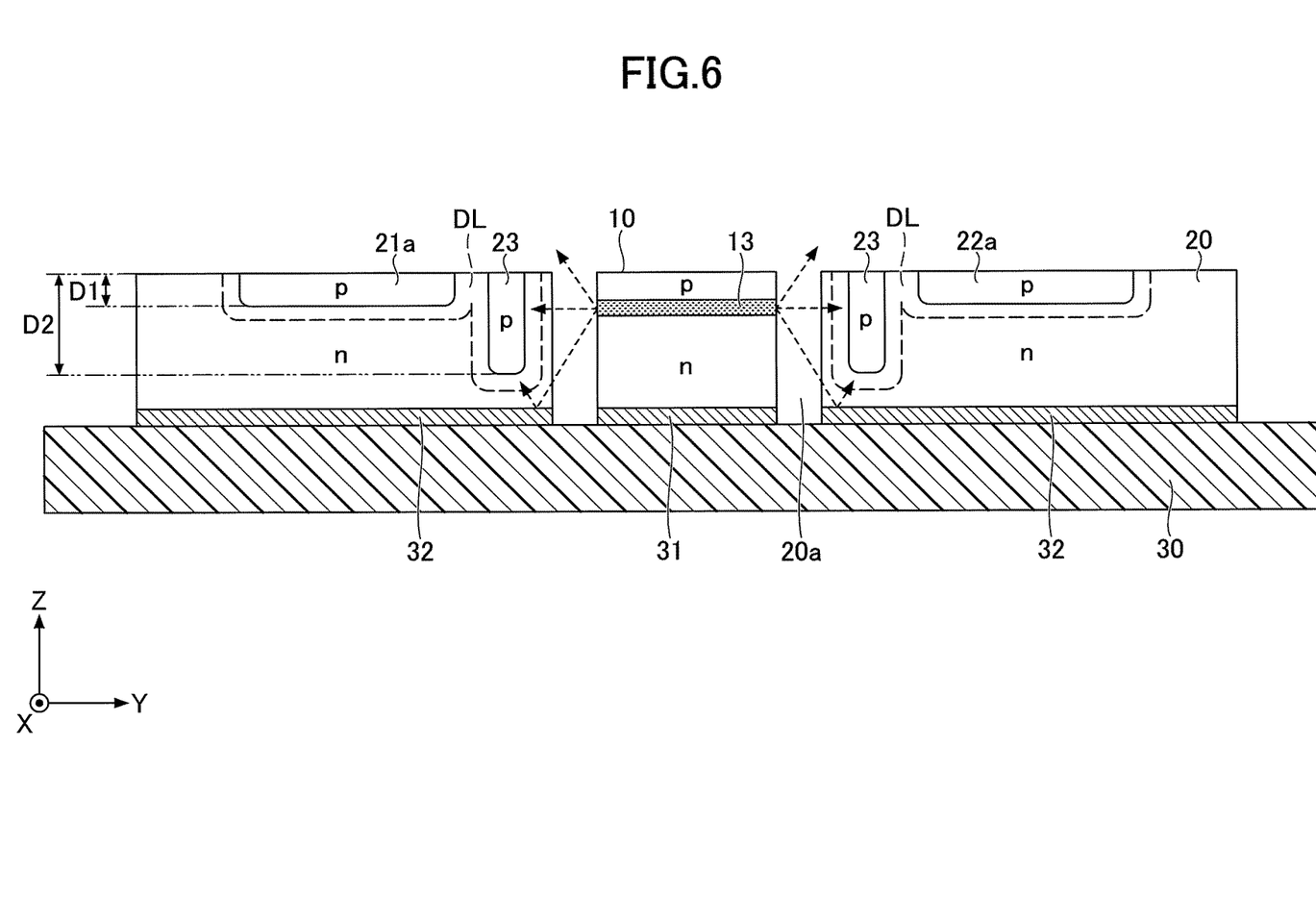
FIG. 6 is a schematic cross-sectional view illustrating a layer structure of a light emitting device and a sensor substrate.

FIG. 6 is a schematic cross-sectional view illustrating the layer structure of the light emitting device 10 and the sensor substrate 20. FIG. 6 schematically illustrates a cross section along the Y direction of the optical module.

As illustrated in FIG. 6, in the present embodiment, the sensor substrate 20 is formed of an n-type semiconductor substrate (for example, a silicon substrate). The light receiving device 21a and the light receiving device 22a are made of a p-type diffusion layer formed by doping the p-type impurities onto the surface layer of the n-type semiconductor substrate. The depth from the surface of each p-type diffusion layer forming the light receiving device 21a and the light receiving device 22a is almost the same. The depth of the p-type diffusion layer is made D1.

Similarly, the dummy light receiving device 23 is made of a p-type diffusion layer formed by doping the p-type impurities onto the surface layer of the n-type semiconductor substrate. That is, the dummy light receiving device 23 is made of the same conductive type impurity diffusion layer as the light receiving device 21a and the light receiving device 22a.

The dummy light receiving device 23 is formed in an annular region surrounding the through-hole 20a. The depth D2 from the surface of the p-type diffusion layer forming the dummy light receiving device 23 is deeper than the depth D1. This means D2>D1. The depth of the p-type diffusion layer can be set by controlling the accelerating voltage at which the impurities are implanted.

By applying a reverse bias voltage to the light receiving devices 21a and 22a and the dummy light receiving device 23, the depletion layer DL generated in the surrounding pn junction region expands. The dummy light receiving device 23 has an effect of absorbing a carrier generated by light entering the sensor substrate 20 from the through-hole 20a.

Because the light emitting device 10 has a layered light emitting layer 13 between the p-type layer and the n-type layer, light is emitted from the light emitting layer 13 from the lateral surface as well as the upper surface. The amount of side light is about several percent of the total amount of light emitted from the light emitting device 10. When the side light enters the sensor substrate 20 and reaches the depletion layer DL of the light receiving devices 21a and 22a, a noise current is generated and the S/N is lowered. However, in the present embodiment, because most of the side light having penetrated into the sensor substrate 20 is absorbed by the dummy light receiving device 23, the generation of the noise current is reduced.

In addition, the side light having entered the sensor substrate 20 may be reflected by the lower surface of the sensor substrate 20 or the surface of the adhesion layer 32. However, in the present embodiment, the dummy light receiving device 23 is formed up to a position deeper than the light receiving devices 21a and 22a. Therefore, the reflected light is absorbed by the dummy light receiving device 23 and the generation of the noise current is reduced.

As described above, according to the present exemplary embodiment, side light can be blocked (absorbed) by the dummy light receiving device 23 formed in the sensor substrate 20 without the light blocking member provided on the side wall of the through-hole in the conventional manner. Because the dummy light receiving device 23 is formed of the same conductive type impurity diffusion layer as the light receiving devices 21a and 22a, the dummy light receiving device 23 can be manufactured by the same manufacturing process as the light receiving devices 21a and 22a, and it is not necessary to add a manufacturing process for forming the dummy light receiving device 23. Hence, according to the present embodiment, it is easier to manufacture and more reliably block the side light from the light source.

The impurity concentration of the dummy light receiving device 23 may be the same as that of the light receiving devices 21a and 22a, but the impurity concentration of the dummy light receiving device 23 may be higher than the impurity concentration of the light receiving devices 21a and 22a. This improves the light absorption coefficient of the dummy light receiving device 23.

Various modifications of the above-described embodiments will be described below.

First Modification

Figure 7:
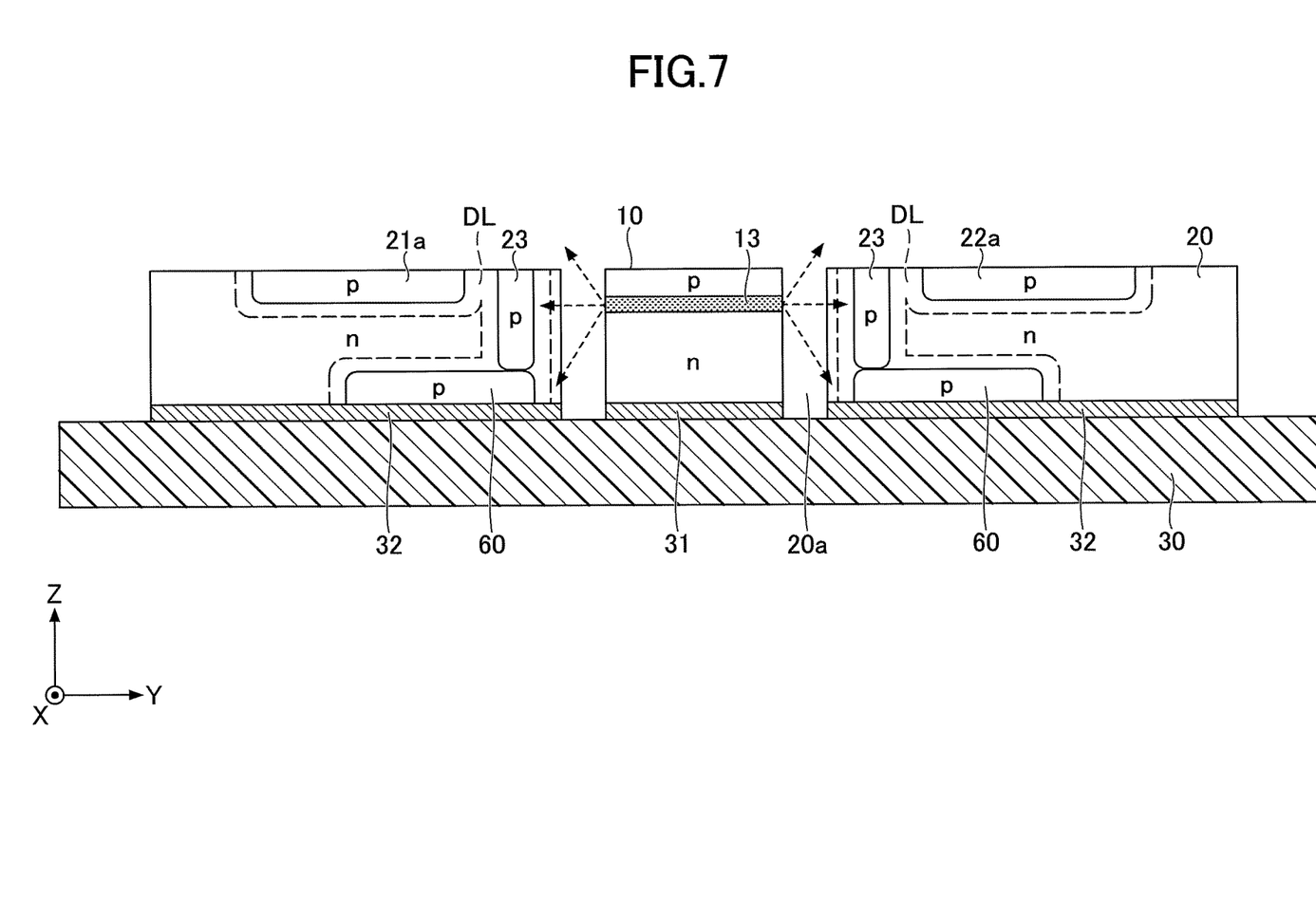
FIG. 7 is a schematic cross-sectional view illustrating a structure of an optical module according to a first modification.

FIG. 7 is a schematic cross-sectional view illustrating a structure of an optical module according to a first modification. The present modification has the same configuration as that of the first embodiment except that the configuration of the sensor substrate 20 is different from that of the first embodiment.

In the sensor substrate 20 according to the present modification, in addition to the dummy light receiving device 23 (the first dummy light receiving device), a second dummy light receiving device 60 is formed on the lower surface of the sensor substrate 20. The second dummy light receiving device 60 is formed of the same conductive type impurity diffusion layer as the first dummy light receiving device 23. In this variation, the second dummy light receiving device 60 is formed of a p-type diffusion layer. The second dummy light receiving device 60 is formed in an annular region that surrounds the through-hole 20a similar to the first dummy light receiving device 23.

When the second dummy light receiving device 60 is reverse biased, the depletion layer DL generated around the p-type diffusion layer forming the second dummy light receiving element 60 spreads. As described above, by providing the second dummy light receiving device 60 in addition to the first dummy light receiving device 23, side light entering the sensor substrate 20 from the light emitting element 10 can be more reliably blocked (absorbed).

The second dummy light receiving device 60 may be connected to the first dummy light receiving device 23. The second dummy light receiving device 60 may have an impurity concentration different from that of the first dummy light receiving device 23.

Second Modification

Figure 8:
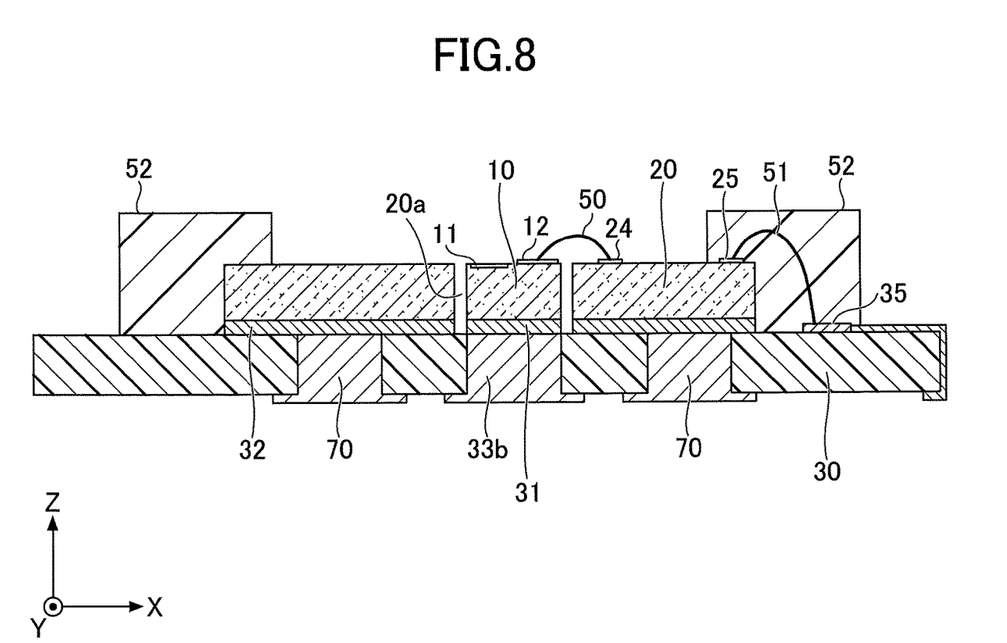
FIG. 8 is a schematic cross-sectional view illustrating a structure of an optical module according to a second modification.

FIG. 8 is a schematic cross-sectional view illustrating a structure of an optical module according to a second modification. The present modification has the same configuration as that of the first embodiment except that the configuration of the fixed substrate 30 is different from that of the first embodiment. In the first embodiment, the power supply voltage (VCC) is applied to the n-type region of the sensor substrate 20 from the fourth external terminal 37*d* through an interconnection layer (not illustrated) formed on the upper surface side of the sensor substrate 20 in order to cause the light receiving devices 21*a* and 22*a* to be reverse biased.

The fixed substrate 30 according to the present modification includes a penetrating electrode 70 for applying a power supply voltage from the backside of the sensor substrate 20 to an n-type region. The penetrating electrode 70 is electrically connected to the backside of the sensor substrate 20 via a conductive adhesive layer 32. The penetrating electrode 70 is exposed from the backside of the fixed substrate 30 and serves as a power supply terminal for applying a power supply voltage.

In order to apply a power supply voltage to the second dummy light receiving device 60 described in the second modification, the fixed substrate 30 according to the present modification may be used.

Third Modification

In the first embodiment, the n-type semiconductor substrate is used as the sensor substrate 20 as illustrated in FIG. 6, but the p-type semiconductor substrate may be used instead of the n-type semiconductor substrate. In this case, the light receiving devices 21*a* and 22*a* and the dummy light receiving device 23 may be formed of an n-type diffusion layer.

When the p-type semiconductor substrate is used as the sensor substrate 20, the ground potential may be provided for the p-type region so that the light receiving elements 21*a* and 22*a* and the dummy light receiving element 23 are reverse biased. In this case, the fixed substrate 30 side of the sensor substrate 20 becomes an anode, and the fixed substrate 30 side of the light emitting element 10 becomes a cathode. Therefore, it is possible to provide a ground potential for the lower surface of the sensor substrate 20 and the lower surface of the light emitting device 10 through a common electrode from the fixed substrate 30. This allows the adhesive layer 31 and the adhesive layer 32 to be made one conductive adhesive layer.

Conversely, the conductive type of the light emitting device 10 may be reversed so that the sensor substrate 20 on the fixed substrate 30 side becomes a cathode, and the light emitting device 10 on the fixed substrate 30 side becomes an anode. In this case, the power supply voltage may be applied from the fixed substrate 30 to the lower surface of the sensor substrate 20 and the lower surface of the light emitting device 10 via a common electrode.

Fourth Modification

Figure 9:
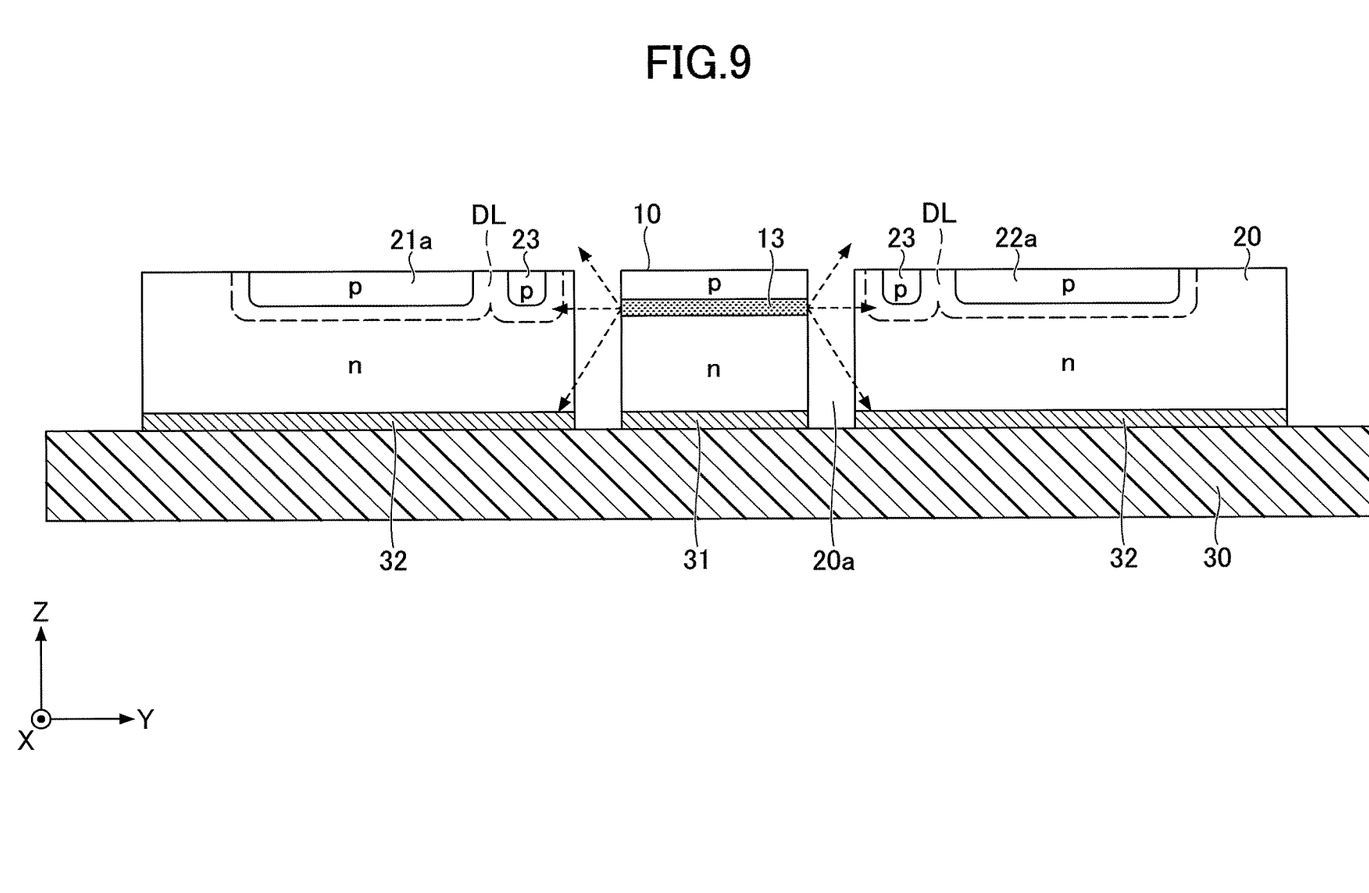
FIG. 9 is a schematic cross-sectional view showing the structure of an optical module according to a fourth modification.

FIG. 9 is a schematic cross-sectional view illustrating a structure of an optical module according to a fourth modification. The present modification has the same configuration as that of the first embodiment except that the configuration of the sensor substrate 20 is different from that of the first embodiment. In the first embodiment, as illustrated in FIG. 6, the impurity diffusion layer forming the dummy light receiving device 23 is formed to be deeper than the impurity diffusion layer forming the light receiving devices 21*a* and 22*a*. However, in the present embodiment, both layers are formed to have the same depth.

Further, in the sensor substrate 20 according to the present modification, the adhesive layer 32 for fixing the sensor substrate 20 to the fixed substrate 30 is a conductive adhesive including a light absorbing member. As the adhesive layer 32 in the present modification, a light blocking sheet having adhesive properties can be used.

As described above, by using the adhesive layer 32 as the conductive adhesive including the light absorbing member, reflected light reflected from the lower surface of the sensor substrate 20 or the surface of the adhesive layer 32 can be reduced without deepening the dummy light receiving device 23.

In the above-described embodiment and modifications, the LED is used as the light emitting device 10, but a semiconductor laser may be used.

As described above, an optical module and an optical encoder according to the present disclosure can readily block side light from a light source while being readily manufactured.

Although the preferred embodiments of the disclosure have been described in detail above, the disclosure is not limited to the embodiments described above, and various modifications and substitutions can be made to the embodiments described above without departing from the scope of the disclosure.

What is claimed is:

1. An optical module, comprising:
a fixed substrate;
a sensor substrate secured to the fixed substrate and having a through-hole formed therein;
a light emitting device secured to the fixed substrate at a position in the through-hole;
a light receiving device provided in the sensor substrate; and
a dummy light receiving device formed between the light receiving device and the through-hole, around the through-hole, and in the sensor substrate,
wherein the light receiving device and the dummy light receiving device are made of an impurity diffusion layer having a same conductive type as a conductive type of a surface layer of the sensor substrate, and
wherein the dummy light receiving device is formed deeper than the light receiving device.

2. The optical module as claimed in claim 1,
wherein the sensor substrate is a semiconductor substrate, and
wherein the light receiving device and the dummy light receiving device are reverse biased pn junction type photodiodes.

3. The optical module as claimed in claim 2, wherein the light emitting device is a light emitting diode.

4. The optical module as claimed in claim 3, wherein the sensor substrate on the fixed substrate side is a cathode, and the light emitting device on the fixed substrate side is a cathode.

5. The optical module as claimed in claim 1, wherein the impurity diffusion layer forming the dummy light receiving device has an impurity concentration higher than that of an impurity diffusion layer forming the light receiving device.

6. An optical module, comprising:
   a fixed substrate;
   a sensor substrate secured to the fixed substrate and having a through-hole formed therein;
   a light emitting device secured to the fixed substrate at a position in the through-hole;
   a light receiving device provided in the sensor substrate; and
   a dummy light receiving device formed between the light receiving device and the through-hole, around the through-hole, and in the sensor substrate,
   wherein the light receiving device and the dummy light receiving device are made of an impurity diffusion layer having a same conductive type as a conductive type of a surface layer of the sensor substrate, and
   wherein the sensor substrate is secured to the fixed substrate via a conductive adhesive layer containing a light absorbing member.

7. An optical encoder, comprising:
   the optical module as claimed in claim 1; and
   a reflective scale.

8. An optical encoder, comprising:
   the optical module as claimed in claim 6; and
   a reflective scale.

* * * * *